(12) United States Patent
Grossauer et al.

(10) Patent No.: US 10,232,458 B2
(45) Date of Patent: Mar. 19, 2019

(54) PLUG PART, JACK PART AND CONNECTING DEVICE AS WELL AS ADAPTER ELEMENT FOR RELEASABLY CONNECTING A LIQUID-COOLED WELDING TORCH TO A HOSE PACKAGE

(71) Applicant: Fronius International GmbH, Pettenbach (AT)

(72) Inventors: Wolfgang Grossauer, Windischgarsten (AT); Christian Resch, Ruhstorf (DE)

(73) Assignee: Fronius International GmbH, Pettenbach (AT)

( * ) Notice: Subject to any disclaimer, the term of this patent is extended or adjusted under 35 U.S.C. 154(b) by 338 days.

(21) Appl. No.: 15/044,439

(22) Filed: Feb. 16, 2016

(65) Prior Publication Data

US 2016/0236304 A1 Aug. 18, 2016

(30) Foreign Application Priority Data

Feb. 17, 2015 (AT) .............................. A 50122/2015

(51) Int. Cl.
*B23K 37/00* (2006.01)
*B23K 9/173* (2006.01)
(Continued)

(52) U.S. Cl.
CPC .............. *B23K 9/173* (2013.01); *B23K 9/295* (2013.01); *B23K 9/323* (2013.01)

(58) Field of Classification Search
CPC ......... B23K 9/173; B23K 9/295; B23K 9/323
(Continued)

(56) References Cited

U.S. PATENT DOCUMENTS 4,221,447 A * 9/1980 Powell ........................ 339/64 M
4,346,279 A * 8/1982 Lessmann ............ B23K 9/0213
219/137.42
(Continued)

FOREIGN PATENT DOCUMENTS

CN 85101985 A 1/1987
CN 102149504 A 8/2011
(Continued)

OTHER PUBLICATIONS

Austrian Office Action in A 50122/2015, dated Nov. 4, 2015, with an English translation of relevant parts.
Chinese Office Action dated Nov. 10, 2017 in CN 201610080675.0.

*Primary Examiner* — Dana Ross
*Assistant Examiner* — Kuangyue Chen
(74) *Attorney, Agent, or Firm* — Collard & Roe, P.C.

(57) ABSTRACT

A plug part releasably connects a liquid-cooled welding torch to a jack part arranged on a hose package, and a connecting device releasably connects a liquid-cooled welding torch to a hose package. In order to provide a connecting device which is suitable for high welding currents and use with hollow shaft robots, each welding current line on the plug part is arranged around a cooling duct, at least in the region of the front face, and the contact area of each welding current line is arranged axially offset from the orifices of the cooling ducts. On the jack part, each welding current line is arranged around a cooling duct, at least in the region of the end piece, and the contact area of each welding current line is arranged axially offset from the orifices of the cooling ducts.

15 Claims, 6 Drawing Sheets

(51) Int. Cl.
*B23K 9/29* (2006.01)
*B23K 9/32* (2006.01)

(58) Field of Classification Search
USPC ............ 219/137.62, 137.63, 137.9; 174/15.7
See application file for complete search history.

(56) References Cited

U.S. PATENT DOCUMENTS

| | | | |
|---|---|---|---|
| 4,496,823 A | 1/1985 | Mann | |
| 5,728,995 A | 3/1998 | Kensrue | |
| 6,078,023 A * | 6/2000 | Jones ..................... | B23K 9/285 |
| | | | 219/137.62 |
| 6,683,279 B1 | 1/2004 | Moerke | |
| 2005/0083161 A1* | 4/2005 | Minerbo ........................ | 336/132 |
| 2009/0050609 A1* | 2/2009 | Berger ................. | B23K 9/1735 |
| | | | 219/121.64 |
| 2009/0260481 A1* | 10/2009 | Boulos ......................... | 75/10.19 |

FOREIGN PATENT DOCUMENTS

| | | | | |
|---|---|---|---|---|
| CN | 203791816 U | 8/2014 | | |
| EP | 0003780 A1 * | 9/1979 | ............ | B23K 9/291 |
| EP | 0 983 818 A2 | 3/2000 | | |
| EP | 2 239 081 A1 | 10/2010 | | |
| KR | 10-1040710 B1 | 6/2011 | | |
| KR | 10-1271986 B1 | 6/2013 | | |

* cited by examiner

PLUG PART, JACK PART AND CONNECTING DEVICE AS WELL AS ADAPTER ELEMENT FOR RELEASABLY CONNECTING A LIQUID-COOLED WELDING TORCH TO A HOSE PACKAGE

CROSS REFERENCE TO RELATED APPLICATIONS

Applicant claims priority under 35 U.S.C. § 119 of Austrian Application No. A 50122/2015 filed Feb. 17, 2015, the disclosure of which is incorporated by reference.

BACKGROUND OF THE INVENTION

1. Field of the Invention

The invention relates to a plug part for releasably connecting a liquid-cooled welding torch to a jack part arranged on a hose package, having a front face, a cylindrical pipe element, at least two axially extending welding wire ducts, at least two cooling ducts each having an orifice and at least two welding current lines each having a contact area.

Furthermore, the invention relates to a jack part for releasably connecting a hose package to a liquid-cooled welding torch, having a cylindrical end piece, at least two axially extending welding wire ducts, at least two cooling ducts each having an orifice and at least two welding current lines each having a contact area.

Finally, the invention relates to a connecting device for releasably connecting a liquid-cooled welding torch to a hose package, and an adapter element for releasably connecting a liquid-cooled single-wire welding torch to a hose package of a multi-wire welding torch.

2. Description of the Related Art

U.S. Pat. No. 6,683,279 B1 shows a double-wire welding torch releasably mounted on a hose package. Mounting a plug part connected to the welding torch on a jack part connected to the hose package is accomplished directly or via a connecting body. Two welding current lines projecting into corresponding holes in the jack part project from the plug part. The welding current lines also serve as welding wire ducts. Cooling ducts having check valves are arranged on the plug part. For high currents, which may exceed 2×300 A, such connecting devices for double-wire welding torches are only usable to a limited extent, and welding errors and/or burn-off of the contact areas on the plug part and/or the jack part may occur.

EP 0 983 818 A2 shows a welding torch having a connecting device including a ball joint for connecting to the hose package, including a current line and a shielding gas feed line as well as cooling ducts.

U.S. Pat. No. 4,496,823 A describes a welding torch having a flexible hose package including several longitudinally extending chambers, within which the current feed line is arranged and the shielding gas is delivered to the welding torch. A releasable connection between welding torch and hose package is not mentioned.

KR 10-1271986 B1 describes a water-cooled welding device having a specifically arranged feed for the cooling liquid in the hose package. A releasable connection between welding torch and hose package is not mentioned.

Finally, U.S. Pat. No. 5,728,995 A shows an arc welding torch that is connected to the respective electric lines, shielding gas feed line and cooling ducts. A releasable connection between welding torch and hose package is not described.

SUMMARY OF THE INVENTION

The object of the present invention is to provide a plug part, a jack part, a connecting device and an adapter element of the specified type, which make it possible to establish a releasable connection of a welding torch to a hose package which is suitable for high welding currents and use with hollow shaft robots as well. Drawbacks of the prior art are to be eliminated or at least reduced.

The object is achieved by a plug part as mentioned above, in which each welding current line is arranged around a cooling duct, at least in the region of the front face, and in which the contact area of each welding current line is arranged axially offset from the orifices of the cooling ducts. Due to the arrangement of the welding current line around the cooling duct at least in the area of the front face of the plug part, a particularly reliable cooling of the welding current line and the contact area may be accomplished. Since the contact area is one of the limiting elements for transmitting high welding currents, the improved and more uniform cooling may also allow the transmission of higher current densities. Unacceptably high heating of the contact areas and damage in conjunction therewith by burn-off or melting losses may be reliably prevented by using this cooling of the welding current lines and their contact areas. Furthermore, the axially offset arrangement of the contact areas and the orifices of the cooling ducts makes it possible to obtain a particularly compact design and thus a small outer diameter of the pipe element of the plug part. Thanks to this, the plug part is suitable for use in welding torches using hollow shaft robots as well.

The compact space-saving design may be improved by arranging the orifices of the cooling ducts protruding away from the front face and arranging the contact areas of each welding current line between the front face and the orifices of the cooling ducts. Furthermore, this arrangement may contribute to forming a cylindrical contact surface of the contact area, which favors a uniformly distributed transmission of current to the jack part.

Preferably, the contact areas of the welding current lines are silvered in order to be able to reduce contact resistance and thus improve the transmission of current.

If a pin-like element, which may be resiliently supported, is provided on the front face of the plug part for being received in a corresponding receiving hole of the jack part, the correct angular position of the plug part with respect to the jack part may be determined and, as a consequence, wrong mating may be prevented.

If the welding current lines are formed by a pipe made of a conductive material at least in the region of the contact areas, the contact area of the welding current line may be formed by the lateral surface of the pipe, thus allowing relatively large contact surfaces.

If each welding current line surrounds a cooling duct concentrically, at least in the region of the contact area, the contact area of each welding current line may be cooled uniformly by the surrounded cooling duct. This favors the transmission of high welding currents and/or allows the transmission of high welding currents in the first place, for example 2×600 A and above in close proximity.

In terms of construction, the design of the plug part may be simplified by each welding current line forming a cooling duct, at least in the region of the contact area. Furthermore, such a design causes direct contact between the cooling liquid and the welding current line, thereby supporting the cooling of the contact area.

A favorable spatial arrangement of cooling duct, welding current line and welding wire ducts complying with the required insulation distances may be obtained by arranging, in the region of the front face, the welding current lines with the cooling ducts and the welding wire ducts diametrically and preferably at equal angular distances with respect to one another. In case of a double-wire welding torch, this means that the welding current lines are offset angularly with respect to the welding wire ducts by 90° each.

If, preferably, replaceable valves are arranged in the cooling ducts in the region of the orifices, an escaping of the cooling liquid in case of a separated connection between plug part and jack part may be prevented.

If the valves are arranged in current mandrels, which current mandrels form the contact areas of the welding current lines, maintenance may be simplified and downtimes and/or maintenance intervals of the welding torch may be reduced. In this way, wear parts such as current mandrels and valves may be replaced together with gaskets in one step, thus being able to reduce maintenance work.

Due to the construction of the plug part according to the invention, an outer diameter of the cylindrical pipe element below 80 mm, in particular between 50 mm and 65 mm, may be obtained. Such dimensions of the plug part are also advantageous when using hollow shaft robots.

If the cylindrical pipe element is sealed using an insulating material, in particular epoxy resin, in the region of the front face, the lines and ducts may be fixed in their positions and the required insulation resistance may be maintained. This may further improve a compact space-saving design of the plug part.

The object is also achieved by a jack part as mentioned above, in which each welding current line is arranged around a cooling duct, at least in the region of the end piece, and in which the contact area of each welding current line is arranged axially offset from the orifices of the cooling ducts. If each cooling duct is surrounded by a respective welding current line, at least in the region of the end piece of the jack part, a particularly reliable cooling of the welding current line and in particular its contact area may be achieved in the jack part as well since in this arrangement the welding current line and thus its contact area are cooled directly or indirectly by the sheath of the cooling duct. As a consequence, the transmission of high welding currents, for example in the range of 2×600 A and above, is possible without unacceptable heating of the contact areas and damage in conjunction therewith by burn-off or melting losses. Since the contact areas of the welding current lines and the orifices of the cooling ducts are arranged axially offset from one another, an unobstructed flow of the cooling liquid and thus improved cooling in the region of the contact areas is accomplished. Furthermore, due to the axially offset arrangement of the contact areas and the orifices, a particularly compact design may be obtained, so use with hollow shaft robots is possible as well.

The transmission of current between jack part and plug part may be further improved if the contact area of each welding current line includes at least one contact element, in particular a contact spring or contact blades. This contact element can increase the contact pressure against the contact area of the plug part, thereby keeping the transition resistance in the current path of the connection between jack part and plug part at a low level. Furthermore, a contact spring or contact blades may create a high number of contact points to both the contact area of the plug part and the jack part. As a consequence, the current may be distributed over many different paths, so the current load of the individual contact points can remain within the acceptable range—even with high welding currents. Cooperating with the cooling, welding currents of more than 2×600 A may be transmitted in this way.

Preferably, at least the contact areas of the welding current lines are silvered in the jack part as well, thus reducing contact resistance and improving the transmission of current.

If a receiving hole for receiving a corresponding pin-like element of the plug part is provided in the cylindrical end piece of the jack part, the desired angular position of the jack part with respect to the plug part may be determined.

If the welding current lines are formed by a pipe made of a conductive material, at least in the region of the contact areas, the contact area may be formed by the lateral surface of the pipe, thus allowing relatively large contact surfaces. This makes it possible to obtain an improved distribution of the current flow and a lower transition resistance.

If, preferably, replaceable valves are arranged in the cooling ducts in the region of the orifices, an escaping of the cooling liquid in case of a separated connection between plug part and jack part may be prevented. If the valves as well as possible gaskets are designed replaceable, downtimes of the welding torch may be reduced.

Advantageously, the outer diameter of the cylindrical end piece of the jack part is below 80 mm, in particular between 50 mm and 65 mm. Such small dimensions are also advantageous for the jack part when using hollow shaft robots.

If the cylindrical end piece is sealed using an insulating material, in particular epoxy resin, the lines and ducts may be fixed in their positions and the required insulation resistance may be maintained. This may improve a compact, space-saving design of the jack part.

The object according to the invention is also achieved by a connecting device for releasably connecting a liquid-cooled welding torch to a hose package, wherein the welding torch includes a plug part as mentioned above and the hose package includes a jack part as described above.

Finally, the object is also achieved by an adapter element as mentioned above for releasably connecting a liquid-cooled single-wire welding torch to a hose package of a multi-wire welding torch, wherein the adapter element includes a plug part as described above for the single-wire welding torch. Thereby, an easy change between single- and multi-wire welding torch on a single hose package may be accomplished.

BRIEF DESCRIPTION OF THE DRAWINGS

The present invention is discussed in more detail with reference to the accompanying figures below, which show advantageous embodiments of the invention in an exemplary, schematic and non-limiting manner. In the drawings

DETAILED DESCRIPTION OF PREFERRED EMBODIMENTS

Figure 1:
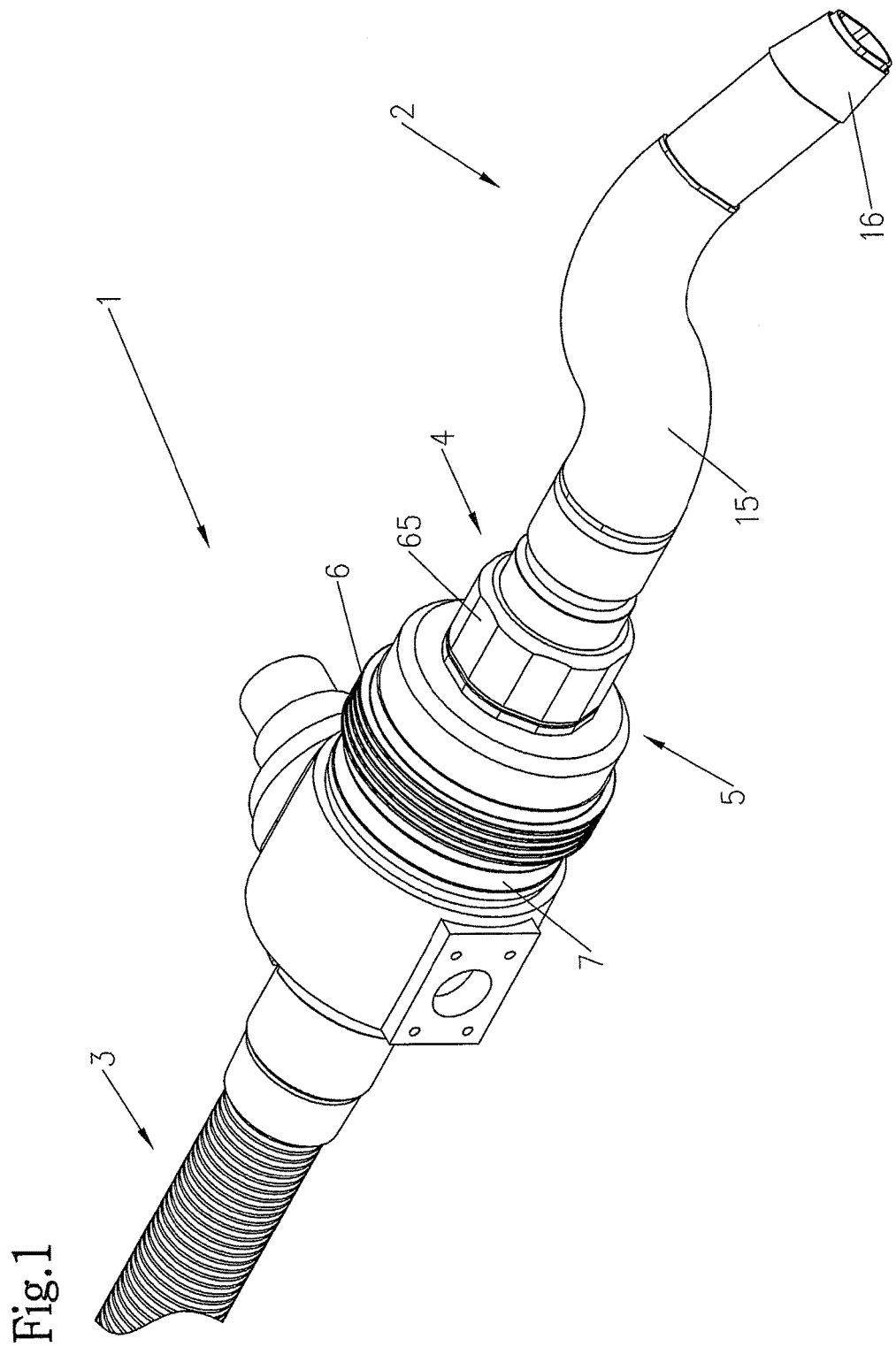
FIG. 1 shows a connecting device for connecting a multi-wire welding torch to a hose package in connected state.

FIG. 1 shows a connecting device 1 for releasably connecting a liquid-cooled multi-wire welding torch 2 to a hose package 3. The connecting device 1 includes a plug part 4 on the multi-wire welding torch and a fitting and/or corresponding jack part 4, which is attached to the hose package 3. Furthermore, the multi-wire welding torch includes a torch body 15 and a gas nozzle 16. In this design, a disconnection box 6 and a robot flange 7 are shown as well, through which the hose package 3 is substantially guided and which are arranged on the final robot axis (as illustrated) when being used with a robot. Two axial welding wire ducts 10, two cooling ducts 11, two welding current lines 12, a shielding gas line 13 and a discharge air line 14 extend in the cylindrical pipe element 8, as discussed in more detail on the basis of FIGS. 2 to 5 below. The plug part 4 may be screwed and secured to the jack part 5 by means of a sleeve nut 65. In general, it is stated that the proposed arrangement of the plug part 4 on the multi-wire welding torch 2 and the jack part 5 on the hose package 3 is not mandatory. It is just as well conceivable for the jack part 5 to be arranged on the multi-wire welding torch 2 and the plug part 4 to be arranged on the hose package 3 in order to provide a releasable connection between the welding torch 2 and the hose package 3.

Figure 2:
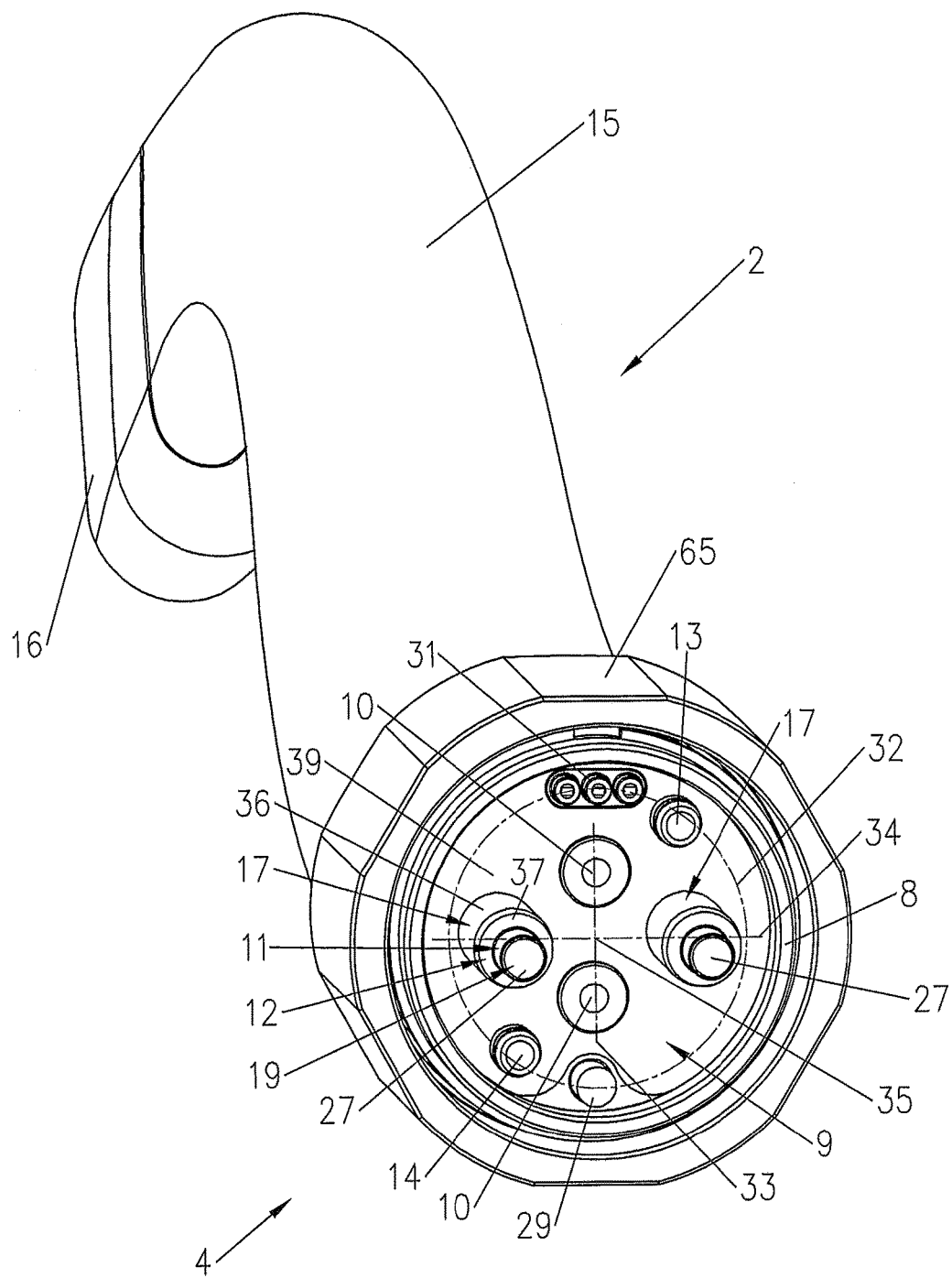
FIG. 2 shows a view of a plug part connected to a welding torch.

As can be seen in the view according to FIG. 2, the outer sheath of the plug part 4 is formed by a cylindrical pipe element 8. Two axial welding wire ducts 10, two cooling ducts 11, two welding current lines 12, a shielding gas line 13 and a discharge air line 14 extend in the cylindrical pipe element 8 from the front face 9 to the torch body 15 and further through it to the gas nozzle 16. In the welding wire ducts 10, welding wires (not illustrated) are conveyed to contact pipes in the gas nozzle 16. The current for creating the electric arc, in particular the working arc, between the electrode and/or the welding wire, which is not illustrated in more detail, and a workpiece composed of one or more portions is supplied via the welding current lines 12 and/or their contact areas 17 via the welding current lines 20 and/or their contact areas 18 of the jack part 5 (see FIG. 3). Cooling the multi-wire welding torch 2 is accomplished by means of a cooling liquid, which is delivered through appropriate cooling ducts 11. The cooling ducts 11 of the plug part 4 terminate in corresponding orifices 19. Valves 27 may be arranged in the cooling ducts 11 in order to prevent an escaping of the cooling liquid in case of a separated connection between the plug part 4 and the jack part 5.

Each welding current line 12 surrounds a respective cooling duct 11 and/or is arranged preferably concentrically around it, at least in the region of the front face 9 of the plug part 4. In this way, a particularly reliable cooling of the welding current line 12 and also especially the contact area 17 of the welding current line 12 is accomplished. This is important because the very contact area 17 is one of the limiting elements for the transmission of high currents from the jack part 5 to the plug part 4. The cooling of the welding current line 12 and the contact area 17 according to the invention allows the transmission of higher welding currents. Unacceptable heating of the contact areas 17 and damage in conjunction therewith by burn-off or melting losses are reliably prevented.

Furthermore, the contact areas 17 of the welding current lines 12 are arranged axially offset from the orifices 19 of the cooling ducts 11. According to this, the transitions of cooling liquid and welding current are arranged directly behind one another, which allows an unobstructed flow of cooling liquid and thus reliable cooling in the region of the contact areas 17 when plug part 4 and jack part 5 are connected. Likewise, the orifices 19 provide a mechanical stabilisation of the contact area 17, so a uniform transmission of current is guaranteed. Furthermore, the offset arrangement of the contact areas 17 and the orifices 19 allows a particularly compact design, which permits a small outer diameter of the cylindrical pipe element 8. This makes it possible to use the connecting device 1 with hollow shaft robots as well.

Figure 3:
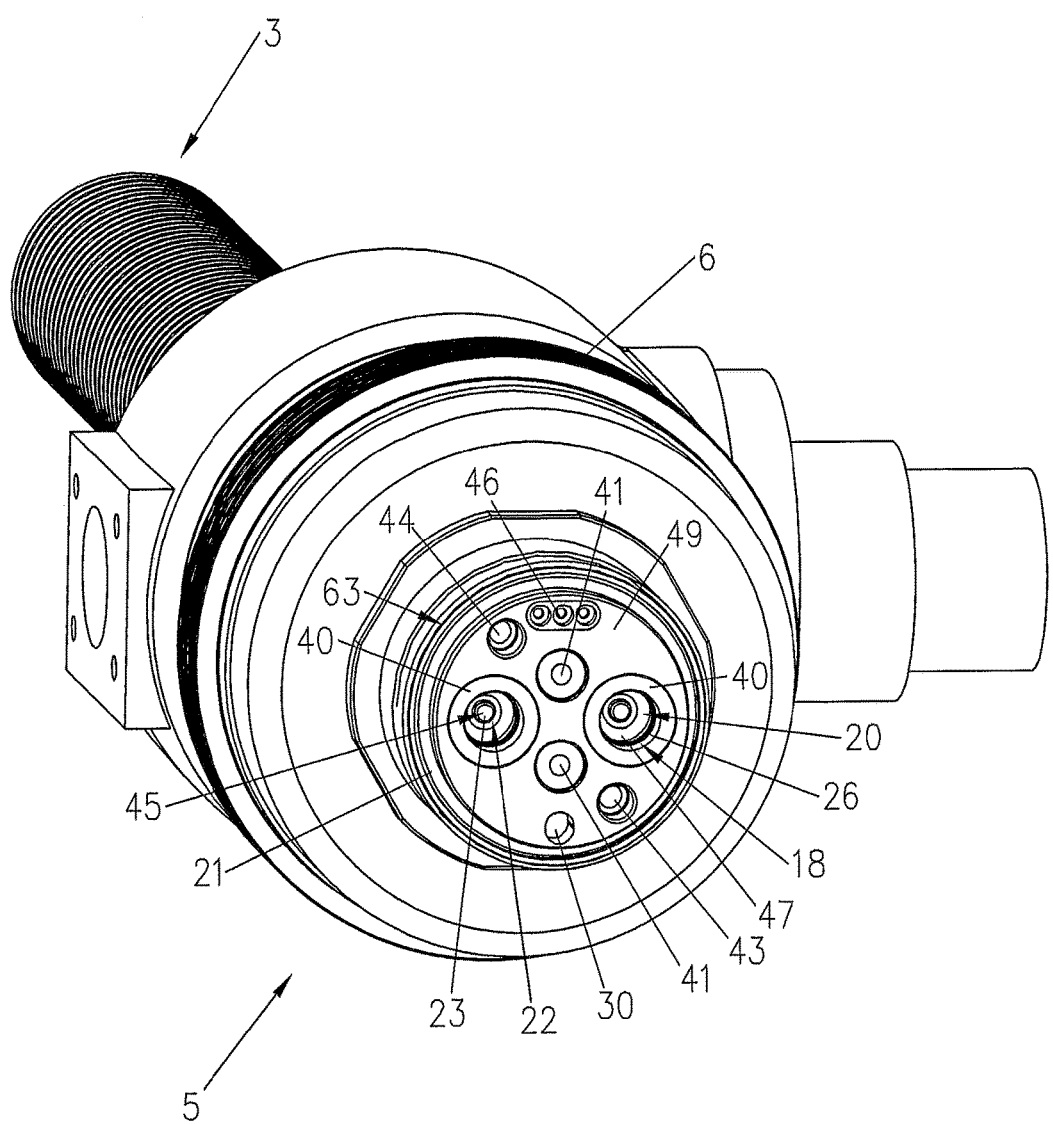
FIG. 3 shows a view of a jack part connected to a hose package.
Figure 4:
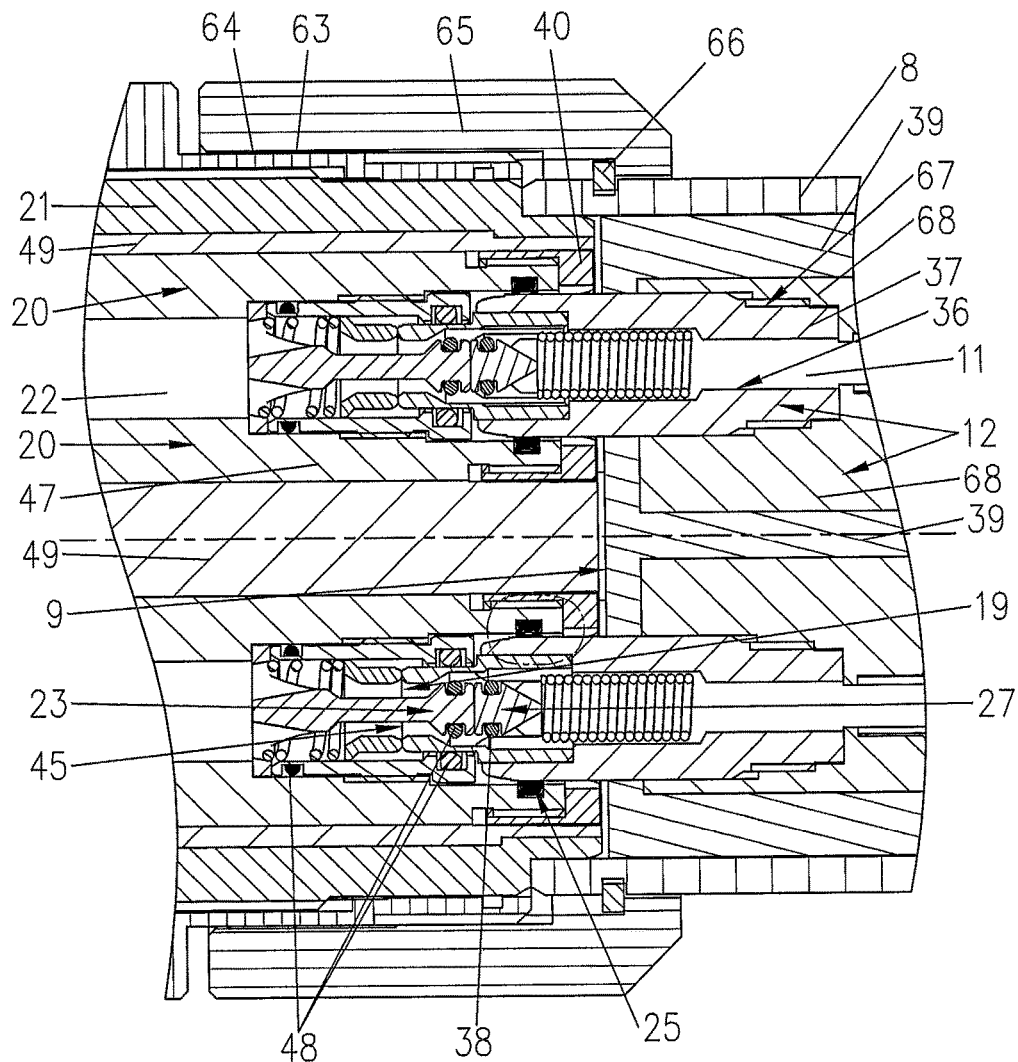
FIG. 4 shows a section through a plug part and a jack part in connected state.

In the plug part 4, a possibly resiliently supported pin-like element 29 may be arranged on the front face 9, fitting into a corresponding receiving hole 30 of the jack part 5 (see FIG. 3). In this way, a certain angular position of the plug part 4 with respect to the jack part 5 is determined. Furthermore, a device for electronic identification 31 of the welding torch may be provided on the plug part 4. This electronic identification 31 makes it possible to verify the compatibility of jack part 5 and plug part 4 and/or between an associated hose package 3 and multi-wire welding torch 2, thus preventing the use of incompatible combinations. Moreover, possible data of the multi-wire welding torch 2 may be transmitted to the hose package 3. In order to obtain a compact arrangement, the shielding gas line 13, the pin-like element 29, the discharge line 14 and the electric identification 31 are arranged substantially on a circle 32 on the front face 9. On an axis 33 between electronic identification 31 and pin-like element 29, the welding wire ducts 10 are arranged substantially diametrically with respect to one another near the centre. Welding current lines 12 as well as the cooling ducts 11 that are surrounded and/or formed by the welding current line 12 are arranged diametrically with respect to one another along an axis 34, which extends between the welding wire ducts 10 and through the centre 35. The axis 33 and the axis 34 are arranged at substantially 90° with respect to one another. This makes it possible to keep the distances required for insulation in spite of a compact, space-saving design.

In the region of the contact areas 17, the welding current lines 12 may be formed by a conductive pipe 36, which pipe 36 surrounds a respective cooling duct 11, preferably concentrically. Since the cooling duct 11 does not have a separate sheath in this region, a cooling duct 11 is formed by the inner lateral surface of the respective welding current line 12. In this way, the compact design and perfect cooling are obtained at the same time, and use with smaller hollow shaft robots is possible as well.

The welding current lines 12 of the plug part 4 may be designed as replaceable current mandrels 37 including the orifice 19 and the contact area 17. The valves 27 of the cooling ducts 11 are preferably replaceable together with possible gaskets 38 and the current mandrels 37 in one step. For this purpose, the current mandrels 37 are attached to an associated current mandrel receiving portion 68 via a thread 67. In the current mandrel 37, the cooling duct 11 has preferably two different diameters, with the diameter being larger in the region of the valve 27. Thereby, required maintenance work on both the current mandrels 37 and the valves 27 may be carried out swiftly, thus reducing downtimes considerably.

The constructional techniques mentioned above allow a compact design of the releasable connection between the plug part 4 and the jack part 5 that makes it possible to obtain outer diameters of below 80 mm, in particular between 50 mm and 65 mm. Thanks to this, use with a hollow shaft robot is possible as well.

The arrangement of the welding wire ducts 10, the welding current lines 12 and the cooling ducts 11 may be fixed by sealing the pipe element 8 using an insulating material 39. An insulating material 39 suitable for this purpose is epoxy resin, for example. Furthermore, sealing the pipe element 8 is also useful for the insulation of the individual welding wire ducts 10 and welding current lines 12. The pipe element 8 may be sealed completely or only in the region of the front face 9.

The jack part 5 corresponding to the plug part 4 is illustrated in more detail in FIG. 3. The jack part 5 may be connected to the hose package 3 directly or via a disconnection box 6, a robot flange 7 or other connecting elements. The jack part 5 includes a cylindrical end piece 21 having two axially extending welding wire ducts 41 for two welding current lines 20 each having a contact area 18. The welding current lines 20 are enclosed by an insulating sleeve 40 in the region of the contact area 18 in order to be able to keep the necessary insulating distances and safety measures. Furthermore, a shielding gas line 43 and a discharge air line 44 as well as two cooling ducts 22 for supplying and returning the cooling liquid are arranged. In order to connect the cooling ducts 22 to the corresponding cooling ducts 11 in the plug part 4, appropriate orifices 45 of the cooling ducts 22 that coincide with the orifices 19 of the cooling ducts 11 in the plug part 4 are located on the end piece 21 of the jack part 5, so the cooling liquid may flow to the end of the multi-wire welding torch 2 in an unobstructed manner. A receiving hole 30 for receiving the pin-like element 29 of the plug part 4 as well as contacts 46 for receiving the electronic identification 31 of the plug part 4 may be arranged in the jack part 5.

In the jack part 5 as well, each welding current line 20 is arranged around a respective cooling duct 22, preferably concentrically with respect to one another, in the region of the end piece 21. In this way, a particularly reliable cooling of the welding current line 20 and especially its contact area 18 is accomplished in the jack part 5 as well since the welding current line 20 and thus its contact area 18 are making contact to the cooling liquid either directly or indirectly via the sheath of the cooling duct 22. The contact areas 18 of the welding current lines 20 are arranged axially offset from the orifices 45 of the cooling ducts 22, allowing an unobstructed flow of the cooling liquid and thus reliable cooling in the region of the contact areas 18 as well as a particularly compact design.

The preferably silvered contact areas 17 of the welding current lines 12 of the plug part 4 and/or the contact areas 18 of the welding current lines 20 of the jack part 5 are particularly suitable for the transmission of high welding currents since they make it possible to further reduce transition resistance.

In the contact area 18, the welding current lines 20 may be formed by a conductive pipe 47, which surrounds the cooling duct 22 concentrically. The orifices 45 of the cooling ducts 22 may also include valves 23 in order to prevent an escaping of the cooling liquid in case of a separated connection of the connecting device 1. The valves 23 and possible wear parts such as gaskets 48, which need to be replaced regularly, are preferably designed to be replaceable in one step. All in all, the constructional techniques mentioned above allow a compact design.

The welding wire ducts 41, the welding current lines 20, the cooling ducts 22, etc. may be fixed and insulated against one another by sealing the cylindrical end piece 21 using insulating material such as epoxy resin in the jack part 5 as well.

When the plug part 4 is connected to the jack part 5 (see FIG. 4), the contact areas 17 of the welding current lines 12 of the plug part 4 abut against the contact areas 18 of the welding current lines 20 of the jack part 5. During the connection of the plug part 4 to the jack part 5, the valves 27 of the cooling ducts 11 projecting from the welding current lines 12 of the plug part 4 are in engagement with the corresponding valves 23 of the cooling duct 22 of the jack part 5, so the valves 27 and 23 are open. The cooling liquid flows through the interior of the welding current lines 12 and 20 in an unobstructed manner and cools them accordingly. The welding current lines 12 and 20 are thus in direct contact with the cooling liquid, so the contact areas 17, 18 are also cooled indirectly via the welding current lines 12 and 20.

The releasable connection of a liquid-cooled multi-wire welding torch 2 to a hose package 3 via the described plug part 4 and jack part 5 may be accomplished by means of a sleeve nut 65 having an internal thread 64 which engages an external thread 63 arranged on the end piece 21 of the jack part 5. The sleeve nut 65 is arranged on the plug part 3 via a tension ring 66. Apart from this connection model, other connecting possibilities such as an exchange coupling for an automated change of the torch are also contemplated.

Figure 5:
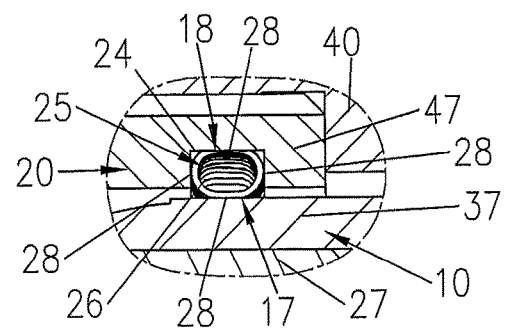
FIG. 5 shows an enlarged representation of a detail view of FIG. 4 in the region of contact in the contact area.
Figure 6:
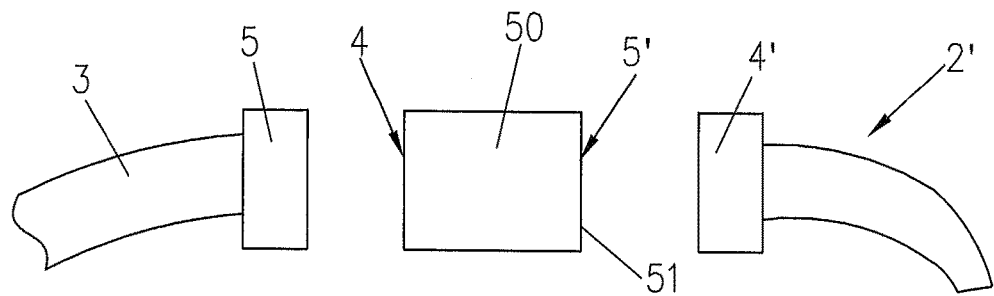
FIG. 6 shows a connection of a single-wire welding torch to a hose package of a multi-wire welding torch by means of an adapter element.
Figure 7:
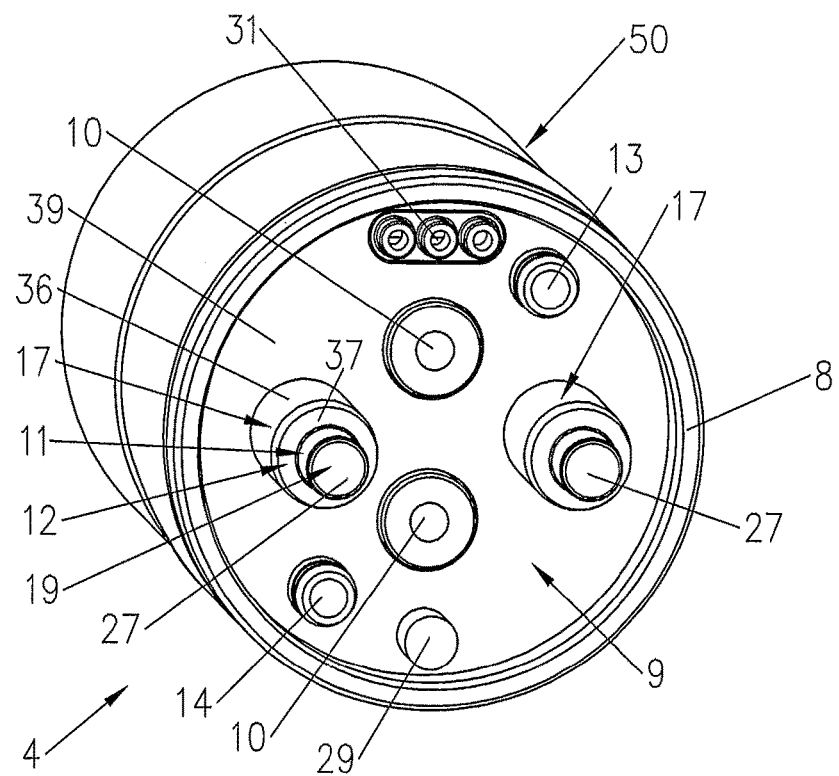
FIG. 7 shows a view of the plug part of the adapter element.
Figure 8:
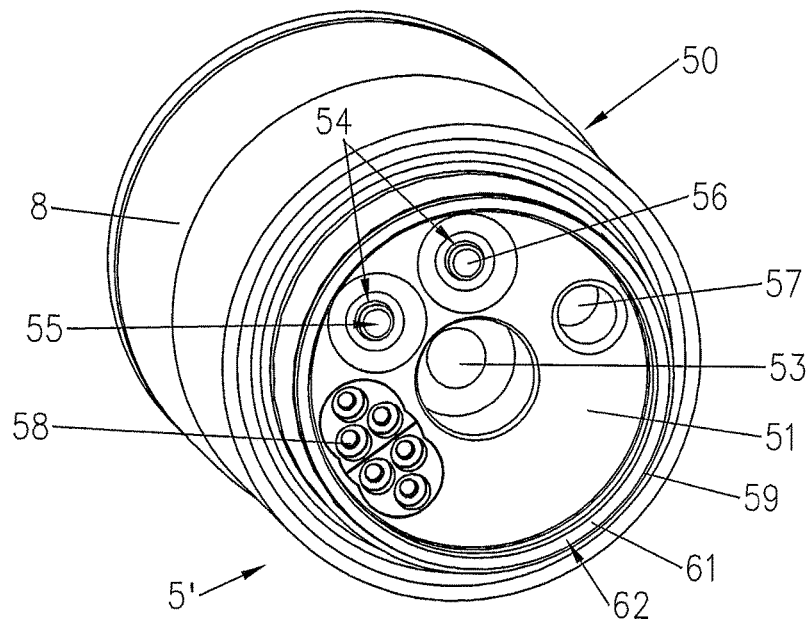
FIG. 8 shows a view of the jack part of the adapter element.
Figure 9:
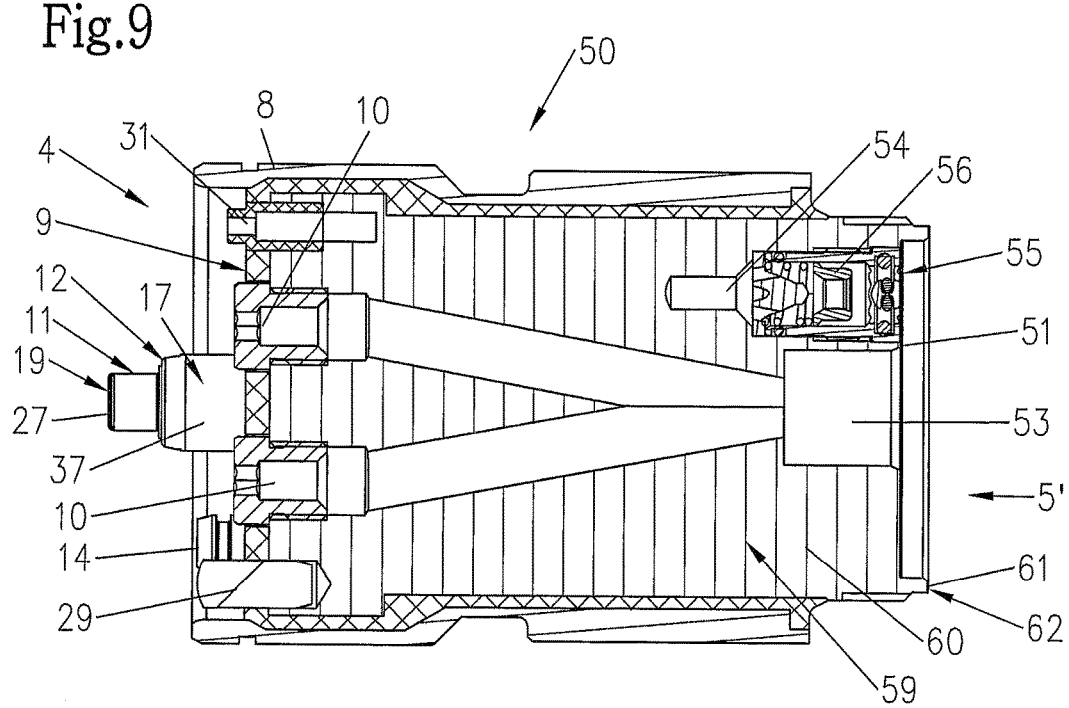
FIG. 9 shows a section through the adapter element.

As can be seen from the detail view in FIG. 5, the contact areas 18 of the welding current lines 20 of the jack part 5 may have grooves 24 for receiving a contact element 25 such as a contact spring 26. This contact spring 26 increases the contact pressure against the contact area 17 of the welding current line 12 of the plug part 4, thereby keeping the transition resistance at a low level. Furthermore, the contact spring 26 causes an increase in the number of contact points 28 to both the contact area 17 of the plug part 4 and the contact area 18 of the jack part 5. As a consequence, the current is distributed over many different paths, so the current load of the individual contact points 28 can be kept at a low level. Cooperating with the cooling via the cooling ducts 11, 22, welding currents of more than 2×600 A may be transmitted. Instead of a contact spring 26, multiple contact springs 26 or contact blades (not illustrated) may be used for improving the contact.

FIGS. 6 to 9 show a different example of use of the plug part 4 for a liquid-cooled welding torch. Here, the plug part 4 is not part of a liquid-cooled multi-wire welding torch 2, but part of an adapter element 50 between the jack part 5 of a hose package 3 for a liquid-cooled multi-wire welding torch 2 and a liquid-cooled single-wire welding torch 2'. The adapter element 50 is provided with a plug part 4 (substantially according to FIG. 2) in order to allow a releasable connection to the jack part 5 according to FIG. 3 of the hose package 3. For the connection to the single-wire welding torch 2', the adapter element 50 has a jack part 5' on the opposite side of the plug part 4, which is designed compatible to a plug part 4' of the single-wire welding torch 2'. On its front face 51, the jack part 5' has a central welding wire duct 53, two cooling ducts 54 the orifices 55 of which are provided with valves 56, a common duct 57 for shielding gas and discharge air, contacts 58 for electronic identification of the single-wire welding torch 2' and a welding current line 59. In the cylindrical pipe element 8 of the plug part 4 of the adapter element 50, the current-carrying cylindrical body 60 is arranged for carrying the welding current and receiving the current mandrels 37. In the cylindrical body 60 of the adapter element 50, both welding wire ducts 10 are joined to form a welding wire duct 53, allowing alternating welding with one of the two welding wires, which are not illustrated. Moreover, in the adapter element 50, the welding current lines 12, the shielding gas duct 13, the discharge air duct 14, the cooling ducts 11 and the electronic identification 31 are realigned for a connection to the corresponding ducts 54, 57 and the lines 58, 59 on the jack part 52. This can be seen at least partly in FIG. 9. On the side of the jack only one welding current line 59 is present in the form of the current-carrying cylindrical pipe element 60, with the transmission of current to the single-wire welding torch 2' being designed tubular in the peripheral region of the jack part 52. The front face 61 of this welding current line 59 forms the contact area 62 to the single-wire welding torch 2'. Thus, this adapter element 50 allows a change between single- and multi-wire welding torch that is easy to handle.

What is claimed is:

1. A plug part for releasably connecting a liquid-cooled welding torch to a jack part arranged on a hose package, the plug part comprising:
   (a) a front face;
   (b) a cylindrical pipe element;
   (c) at least first and second axially extending welding wire ducts;
   (d) at least first and second cooling ducts having first and second orifices, respectively; and
   (e) at least first and second welding current lines having first and second contact areas, respectively;
   wherein the first and second welding current line are arranged around the first and second cooling ducts, respectively, at least in a region of the front face,
   wherein the first and second contact areas are arranged axially offset from the first and second orifices, respectively,
   wherein the first welding current lines surrounds the first cooling duct concentrically, at least in the region of the first contact area,
   wherein the second welding current line surrounds the second cooling duct concentrically, at least in the region of the second contact area,
   wherein the first and second welding current lines are formed by a pipe made of a conductive material at least in the region of the first and second contact areas, respectively,
   wherein the first welding current line forms the first cooling duct, at least in the region of the first contact area and
   wherein the second welding current line forms the second cooling duct, at least in the region of the second contact area.

2. The plug part according to claim 1, wherein the first and second orifices of the first and second cooling ducts, respectively, are arranged protruding away from the front face and the first and second contact areas of the first and second welding current lines, respectively, are arranged between the front face and the first and second orifices.

3. The plug part according to claim 1, wherein a pin-like element is provided on the front face for being received in a corresponding receiving hole of the jack part in order to determine the angular position of the plug part with respect to the jack part.

4. The plug part according to claim 1, wherein in the region of the front face, the first and second welding current lines are arranged diametrically with respect to one another, the first and second welding wire ducts are arranged diametrically with respect to one another and each first current line and second current line is arranged at an equal angular distance from each first welding wire duct and second welding wire duct.

5. The plug part according to claim 1, wherein replaceable valves are arranged in the first and second cooling ducts in the region of the first and second orifices, respectively.

6. The plug part according to claim 5, wherein the valves are arranged in first and second current mandrels, wherein the first current mandrel forms the first contact area of the first welding current line and the second current mandrel forms the second contact area of the second welding current line.

7. The plug part according to claim 1, wherein the outer diameter of the cylindrical pipe element is below 80 mm.

8. The plug part according to claim 1, wherein the cylindrical pipe element is sealed using an insulating material.

9. An adapter element for releasably connecting a liquid-cooled single-wire welding torch to a hose package for a multi-wire welding torch, wherein the adapter element has a plug part according to claim 1.

10. A jack part for releasably connecting a hose package to a liquid-cooled welding torch, the jack part comprising:
   (a) a cylindrical end piece;
   (b) at least first and second axially extending welding wire ducts;
   (c) at least first and second cooling ducts having first and second orifices, respectively; and
   (d) at least first and second welding current lines having first and second contact areas, respectively;
   wherein the first and second welding current line are arranged around the first and second cooling ducts, respectively, at least in a region of the end piece,
   wherein the first and second contact areas are arranged axially offset from the first and second orifices, respectively,
   wherein the first welding current lines surrounds the first cooling duct concentrically, at least in the region of the first contact area,
   wherein the second welding current line surrounds the second cooling duct concentrically, at least in the region of the second contact area,
   wherein the first and second welding current lines are formed by a pipe made of a conductive material at least in the region of the first and second contact areas, respectively,
   wherein the first welding current line forms the first cooling duct, at least in the region of the first contact area,
   wherein the second welding current line forms the second cooling duct, at least in the region of the second contact area, and
   wherein the first and second contact areas of the first and second welding current lines, respectively, include at least first and second contact elements, respectively.

11. The jack part according to claim 10, wherein a receiving hole for receiving a corresponding pin-like element of the plug part is provided in the cylindrical end piece in order to determine the angular position of the jack part with respect to the plug part.

12. The jack part according to claim 10, wherein replaceable valves are arranged in the first and second cooling ducts in the region of the first and second orifices, respectively.

13. The jack part according to claim 10, wherein the outer diameter of the cylindrical end piece is below 80 mm.

14. The jack part according to claim 10, wherein the cylindrical end piece is sealed using an insulating material.

15. A connecting device for releasably connecting a liquid-cooled welding torch to a hose package comprising:
(a) a plug part; and
(b) a jack part;
wherein the plug part comprises a front face, a cylindrical pipe element, at least first and second axially extending welding wire ducts, at least first and second cooling ducts having first and second orifices, respectively, and at least first and second welding current lines having first and second contact areas, respectively;
wherein the first and second welding current lines are arranged around the first and second cooling ducts, respectively, at least in a region of the front face, and the first and second contact areas are arranged axially offset from the first and second orifices, respectively;
wherein the first welding current line surrounds the first cooling duct concentrically, at least in the region of the first contact area;
wherein the second welding current line surrounds the second cooling duct concentrically, at least in the region of the second contact area;
wherein the first and second welding current lines are formed by a pipe made of a conductive material at least in the region of the first and second contact areas, respectively;
wherein the first welding current line forms the first cooling duct, at least in the region of the first contact area;
wherein the second welding current line forms the second cooling duct, at least in the region of the second contact area;
wherein the jack part comprises a cylindrical end piece, at least first and second axially extending welding wire ducts, at least first and second cooling ducts having first and second orifices, respectively, and at least first and second welding current lines having first and second contact areas, respectively;
wherein the first and second welding current line are arranged around the first and second cooling ducts, respectively, at least in a region of the end piece, and the first and second contact areas are arranged axially offset from the first and second orifices, respectively;
wherein the first welding current line surrounds the first cooling duct concentrically, at least in the region of the first contact area;
wherein the second welding current lines surrounds the second cooling duct concentrically, at least in the region of the second contact area;
wherein the first and second welding current lines are formed by a pipe made of a conductive material at least in the region of the first and second contact areas, respectively;
wherein the first welding current line forms the first cooling duct, at least in the region of the first contact area;
wherein the second welding current line forms the second cooling duct, at least in the region of the second contact area; and
wherein the first and second contact areas of the first and second welding current lines, respectively, include at least first and second contact elements, respectively.

* * * * *